No. 857,955. PATENTED JUNE 25, 1907.
C. A. MILLER.
MUSICAL CHORD INDICATOR.
APPLICATION FILED OCT. 30, 1906.
2 SHEETS—SHEET 1.
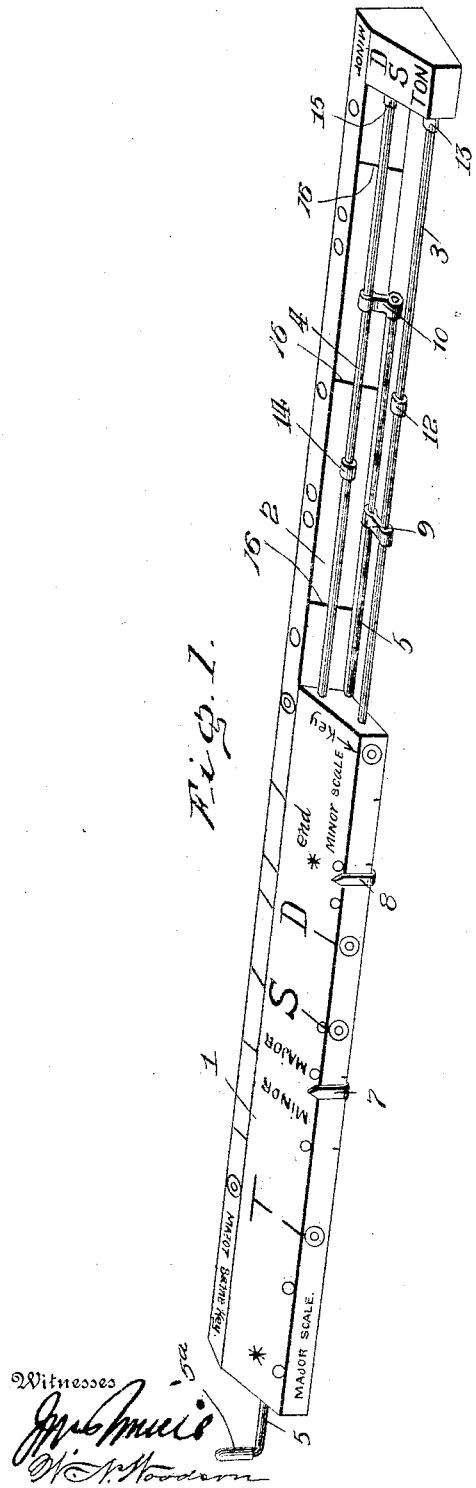
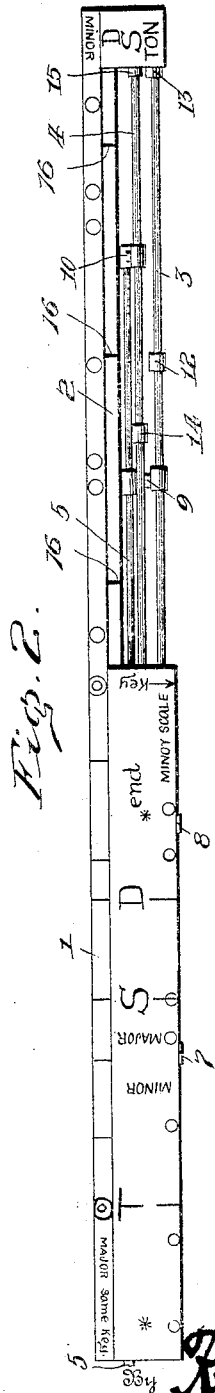
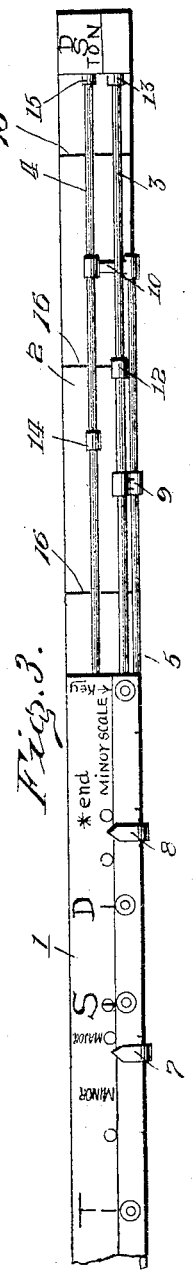

No. 857,955. PATENTED JUNE 25, 1907.
C. A. MILLER.
MUSICAL CHORD INDICATOR.
APPLICATION FILED OCT. 30, 1906.
2 SHEETS—SHEET 2.
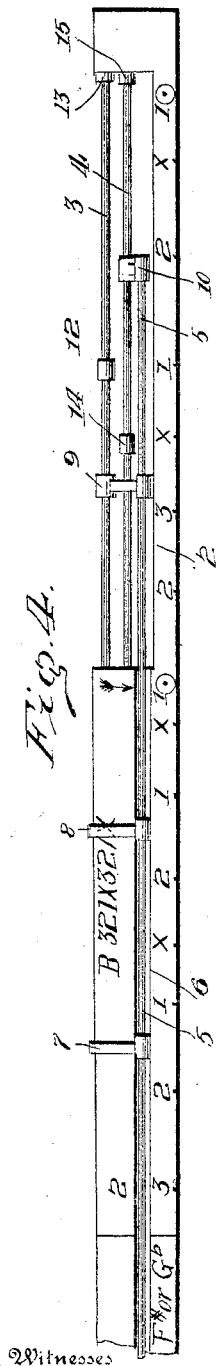
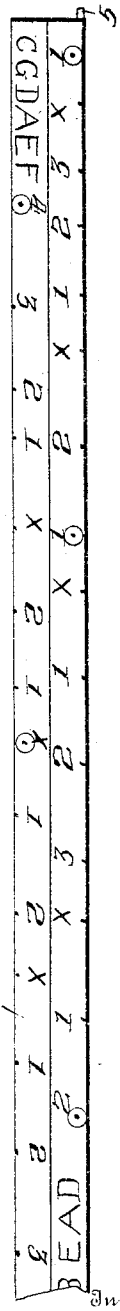
Witnesses
Inventor
C. A. Miller
By
Attorneys

UNITED STATES PATENT OFFICE.

CHARLES A. MILLER, OF VERNON, FLORIDA.

MUSICAL-CHORD INDICATOR.

No. 857,955.  Specification of Letters Patent.  Patented June 25, 1907.

Application filed October 30, 1906. Serial No. 341,283.

*To all whom it may concern:*

Be it known that I, CHARLES A. MILLER, a citizen of the United States, residing at Vernon, in the county of Washington and State of Florida, have invented certain new and useful Improvements in Musical-Chord Indicators, of which the following is a specification.

This invention contemplates certain new and useful improvements in educational appliances particularly designed for use in connection with the piano or organ, and the object of the invention is to provide an improved chord indicator which will facilitate, make plain, as well as pleasant and interesting the study of harmony, and which will render more practicable and easy the art of playing the piano or organ for solo and duet work, as well as facilitating the art of playing accompaniments.

With these and other objects in view as the description proceeds, the invention consists in the details of construction and arrangement of certain indicia upon a chord indicator as will more fully appear hereinafter and be specifically pointed out in the appended claims.

For a full understanding of the invention and the merits thereof and also to acquire a knowledge of the details of construction of the means for effecting the result, reference is to be had to the following description and accompanying drawings, in which:

Figure 1 is a perspective view of my improved musical chord indicator; Fig. 2 is a top plan view; Fig. 3 is an edge view; Fig. 4 is a view looking at the opposite face from that seen in Fig. 2; Fig. 5 is an edge view opposite to the edge view seen in Fig. 3; and, Fig. 6 is a view similar to Fig. 5, but with the appliance inverted end for end.

Corresponding and like parts are referred to in the following description and indicated in all the views of the drawings by the same reference characters.

My improved chord indicator comprises an appliance adapted to be supported upon a key-board of a piano or organ for the purpose of instruction, and in the present instance, this appliance is in the shape of an elongated block 1 which, preferably, is thicker along one longitudinal edge than the other and is provided with one flat and one beveled face. This block is provided with a recess 2, and two longitudinal rods 3 and 4 are mounted in said recess, one in front of the other, with the rear rod in a slightly higher plane than the front rod.

5 indicates an adjusting rod which is mounted to slide longitudinally, preferably in a groove 6 in one face of the appliance, and said adjusting rod is provided with mode indicating fingers 7 and 8 which extend laterally therefrom and project around one edge of the appliance, and with two other fingers designated 9 and 10, respectively, and all mounted in the recess 2, the finger 9 being looped around and mounted to slide upon the front rod 3, the finger 10 being similarly mounted upon the rear rod 4. The fingers 9 and 10 carry indicating devices which may be in the form of collars or pieces of yarn, preferably brilliantly colored, so as to be easily discernable. In addition to these indicating devices, there is a pair of indicating devices designated 12, and 13 on the rod 3 and another pair designated 14 and 15 upon the rod 4. The adjusting rod 5 is provided at one end of the appliance with a laterally bent extremity $5^a$, serving as a finger piece, so that the rod may be easily moved in a longitudinal direction.

In addition to the strictly mechanical features above specified, my improved chord indicator embodies certain indicia and arrangements thereof, which will now be described in connection with some of the many examples illustrating the use of the device. For the purposes of illustration, we will assume that we have before us a key-board of a piano or organ, and as the key of C-major is generally recognized as the key most readily understood and easy to play, we will imagine that the instrument is placed on the key-board with a view of studying the harmony or main tones of this key.

At about its middle, my improved chord indicator is provided with the representation of a transversely extending arrow in line with which appears the word "key". This arrow indicates the key in which we are to play. For the purposes of illustration, let it be supposed that the instrument is placed on the key-board with the word "key" in the arrow directly over middle "C". To the left of this arrow will be seen three capital letters displayed upon the face of the appliance which is then uppermost, said letters being "T", "S" and "D" and standing for the words tonic, sub-dominant, and dominant chords. These letters, in the present instance which we are illustrating are standing directly over the keys "C", "F" and "G" respectively, and we will therefore see that in this key of "C" as well as in other keys, these letters indicate in the bass clef the keys which are to be struck to obtain the keys or fundamentals of the tonic, dominant and sub-dominant chords of the key of "C". Looking to the right of the arrow and the word "key", it will be found that the indicating fingers 9, 12 and 13 are directly over keys "E", "G" and "C" and that the abbreviation "Ton." appears at the extreme right hand end of the appliance in alinement with the front rod 3 and the said fingers 9, 12 and 13. This abbreviation "Ton." refers to the tonic chord, and as the fingers 9, 12 and 13 are directly over the keys "E", "G" and "C", we will see that the treble chord of three keys (which is the one usually employed in simple harmony) is composed of these three keys "E", "G" and "C", and even without knowing these keys, the indicating fingers mentioned will teach us the proper treble chord corresponding to the tonic bass key indicated by the capital letter "T". In similar manner, the fingers indicating the devices 14 and 15 on the rod 4 and the finger 10 on said rod indicating the sub-dominant treble chord corresponding to the bass key indicated by the letter "S". At the extreme right hand end of the instrument, above the abbreviation "Ton." and in alinement with the rod 4 will be found another letter "S" indicating the three keys "F", "A" and "C" over which the indicating divices 14 and 15 are located and comprising the sub-dominant chord of the key. Above the letter "S" at the extreme right hand end of the appliance will be found the letter "D" which corresponds to the letter "D" in the bass and refers to the dominant chord, the keys of this chord being indicated by stripes 16 extending perpendicularly on the rear wall of the recess 2. These stripes, in the present instance, that we are illustrating will be found over the keys "D", "G" and "B" and indicate the dominant chord of the key of "C", which corresponds to the bass dominant key indicated by the letter "D" toward the left hand end of the appliance, as above noted. So far as this example has proceeded, the chords have been indicated as in the major mode. In order to indicate the minor mode of any key, the fingers 9 and 10 are mounted to move longitudinally while the remaining fingers and indicating devices on the rods 3 and 4 are stationary. In this illustration, the mode indicating finger 7 has been placed in registry with indices on the face of the appliance with the word "Major" above the same. Along side of the word "Major" is the word "Minor" and it will be found that by moving the adjusting rod longitudinally so as to bring the finger 7 opposite the word "Minor" that the fingers 9 and 10 have been moved so as to indicate the minor treble chords, tonic, dominant and sub-dominant of the key which is being played. It is to be understood that the key of "C" is merely taken as an illustration and that the foregoing remarks apply equally as well and the instrument is equally applicable to the other keys, both in the major and minor modes. The finger 8 serves to indicate tone 6 of the scale, and as the rod slides to the left as shown in Fig. 1, the finger 8 is carried along with it and thus "flats" the sixth tone of the scale. By this means the minor note of the scale is obtained. With the appliance still in the same position, it will be found to display at the front edge of its upper face a row of small circles, or similar indicating means which begin at the extreme left hand end of the appliance and end at a star to the right where the word "End" is displayed. These circles will be seen to stand directly over the keys constituting a minor scale, the appliance being thus marked on the face of the instrument just between the word "End" and the representation of the arrow. Below this row of circles, on the front edge of the instrument will be seen the words "Major scale" and a series of larger circles inclosing small circles and dots, the large circles being directly over the keys which when played produce the tonic, dominant and sub-dominant of the scale, while the dots represent the other keys of the major scale. It will thus be seen that in convenient juxtaposition are displayed indicia representing the major scale of "C" and its relative minor, or in other words, speaking generally, it will be seen by this means, the student may at once be taught what keys it is necessary to strike to run a major scale and its relative minor, or the minor scale and its relative major.

If, now, the appliance is reversed, end for end and replaced upon the key-board of the instrument in such manner that "T" will be seen toward the right end and up-side-down with the word "Key" and the arrow head directly over the middle "C" of the key-board, the student will see toward the left and upper end, the word "Minor" and then looking at the appliance and toward the right, there will be seen displayed seven small circles and one large circle directly over eight keys of the key-board. The keys indicated by these circles denote a minor scale embodying the keys of "C", "D" and "E" flat, "F", "G" and "A" flat, and "B" and "C". Continuing, counting on toward the right on the appliance, six lines and one large circle will be found in alinement with the small circles and beyond said dots the word "Major" and the words "Same key". The said lines and circles are located directly over eight keys of the key-board and constitute a major scale, and the purpose of these rows of circles and lines in alinement with each other is to illustrate the differences between a major and a minor scale in the same key. Hence, it will be seen that the major and minor scales of each key of the key-board are illustrated at every single adjustment of the appliance to the various keys of the key-board.

In addition to the indicia above noted, my improved appliance facilitates the acquisition of the art of fingering. It is universally agreed that no scale practice is effective until it is done by memory, but to learn the scales in the usual way by reading them from the staff until memorized, is a tedious task. By my instrument, the difficulties of playing all the different scales and fingering them properly is rendered easy and interesting.

If the appliance be turned over so that it rests upon its beveled face with the capital letters "T", "S" and "D" directly under the instrument as seen in Fig. 5, at the left hand end, it will be seen the letters "C", "G", "D", "A", "E" and "F", indicating different keys, such as C-natural, G-natural, in which one sharp occurs, D-natural, in which two sharps occur and so on. In line with these letters will be seen a row of dots ending with circles and numerals 4, 3, 2, 1, the letter X, 2, 1 X; 1, 2 X; 1, 2, 3, 4; thus indicating that in running any one of these scales, the player is to use first the fourth finger, then the third, second, forefinger and thumb, then the second finger, forefinger and thumb, and so on, and in this manner, it is evident that the practice of scales may be rendered very easy without the necessity of reading from the staff. The circles in this row are on every eighth key and indicate the key in which the scales are to be run. There are other keys, however, and to readily learn how to run the scales in these remaining keys of "B", "E", "A" and "D", the appliance is turned over end for end as seen in Fig. 6 so that it will rest upon the key-board of the instrument upon the adjusting rod 5. Now, it will be seen that at the extreme left hand end of the appliance occur the letters "B", "E", "A" and "D". The appliance is to be placed so that the small circle in the middle rests directly over the center of the key represented by any one of these letters, and then the scale is run by fingering exactly as the fingers are indicated, taking note, however, that these letters "B", "E", "A" and "D" represent black keys, that is, they are flats. Now, by turning the appliance end for end and setting it upon its face so that the adjusting rod 5 may be seen, to the left end will be seen "F-sharp" or "G-flat". This is in reality one key for both "F-sharp" and "G-flat", being identically the same thing and fingered alike. There is still one more key to be fingered, namely "B-natural", and the fingering of this key is indicated thus as seen in Fig. 4; B 3, 2, 1, X; 3, 2, 1, X, being seen just between the mode indicating fingers 7 and 8.

It is evident from the foregoing description in connection with the accompanying drawings that my appliance may be used to facilitate the playing of accompaniments either by ear or by sight reading in connection with specially devised music. All the player has to do to learn to play any accompaniment in any key, such accompaniment embodying the three main chords, is to place the instrument so that the arrow is over the key in which the piece is to be played and if the piece is to be played in the major mode, all the performer has to do is to adjust the mode indicating fingers 7 and 8 and notice on the key-board, the chords indicated by the indicating fingers on the rods and at the rear wall of the recess, and the keys indicated by the capital letters "T", "S" and "D" in the bass clef. If the piece is to be played in the minor mode, the adjusting rod is manipulated as hereinbefore described.

It will thus be seen that my improved mode indicator enables any one to play upon a piano or organ either by ear or by note, if the music be especially devised for use in connection with my instrument and that the appliance will render interesting and easy the study of harmony and will also assist the student or other performer in running the scales with proper fingering.

Having thus described the invention, what is claimed as new is:

1. A musical chord indicator comprising an appliance adapted to rest upon the key-board of an instrument and provided with a tonic key indicator and a longitudinal recess, two longitudinal rods in said recess, said rods being provided with indicating fingers spaced to indicate the tonic and sub-dominant chords of the key which is being played when the tonic key indicator is in place, means for indicating the relative dominant chord of said key when the tonic key indicator is in place, and means for adjusting a finger upon each of the rods, as and for the purpose specified.

2. A musical chord indicator consisting of an appliance adapted to rest upon the key-board of an instrument and provided with a tonic key indicator and a longitudinal recess, the rear wall of the recess displaying indicating devices spaced to indicate the dominant chord of the key which is being played when the tonic key indicator is in place, two longitudinal rods secured to the appliance in said recess, stationary indicating devices on each of said rods and designating certain keys in the tonic, and sub-dominant chords of the key when the tonic key indicator is in place, an adjusting rod mounted to slide longitudinally on the appliance, and fingers carried by said rod and mounted to move on the two first named rods, respectively, said fingers indicating keys that are embodied in the tonic and sub-dominant chords of the key that is being played when the tonic key indicator is in place and susceptible of movement longitudinally with the adjusting rod whereby to indicate the change from a major mode to a minor mode and vice versa.

3. A musical chord indicator consisting of an appliance adapted to rest upon the keyboard of an instrument and provided with a tonic key indicator and a longitudinal recess, the rear wall of the recess displaying indicating devices spaced to indicate the dominant chord of the key which is being played when the tonic key indicator is in place, two longitudinal rods secured to the appliance in said recess, stationary devices on each of said rods and so spaced from the tonic key indicator as to represent certain keys in the tonic, and sub-dominant chords of the key that is being played, an adjusting rod mounted to slide longitudinally on the appliance, and fingers carried by said rod and mounted to move on the two first named rods, respectively, said fingers spaced to indicate keys that are embodied in the tonic and sub-dominant chords of the key that is being played when the tonic key indicator is in place and susceptible of movement longitudinally with the adjusting rod whereby to indicate the change from a major mode to a minor mode and vice versa, the adjusting rod being provided with laterally extending mode indicating fingers, and the appliance displaying the words major and minor which are intended for registry with one of said mode indicating fingers.

In testimony whereof I affix my signature in presence of two witnesses.

CHARLES A. MILLER. [L. S.]

Witnesses:
G. J. PARISH,
J. D. PARISH.